US008954812B2

United States Patent
Wang

(10) Patent No.: US 8,954,812 B2
(45) Date of Patent: Feb. 10, 2015

(54) COMPUTER ERROR DETECTION DEVICE AND METHOD

(75) Inventor: Yin-Zhan Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 314 days.

(21) Appl. No.: 13/479,276

(22) Filed: May 24, 2012

(65) Prior Publication Data

US 2013/0159789 A1    Jun. 20, 2013

(30) Foreign Application Priority Data

Dec. 15, 2011 (CN) .......................... 2011 1 0420232

(51) Int. Cl.
*G06F 11/00* (2006.01)
(52) U.S. Cl.
USPC ............................................................ 714/57
(58) Field of Classification Search
CPC .............. G06F 11/0748; G06F 11/327; G06F 11/0709; G06F 11/0769; G06F 11/0793; G06F 11/0772; G06F 11/0781
USPC ...................................................... 714/48, 57
See application file for complete search history.

(56) References Cited

U.S. PATENT DOCUMENTS

2006/0111919 A1*    5/2006    Bang ............................. 704/501

* cited by examiner

*Primary Examiner* — Yair Leibovich
(74) *Attorney, Agent, or Firm* — Novak Druce Connolly Bove + Quigg LLP

(57) ABSTRACT

An exemplary computer error detection device for detecting the warning sounds emitted by a malfunctioning computer is provided. The computer error detection device includes a storage unit, a display unit, a detection unit, and a processing unit. The storage unit includes a look-up table (LUT). The LUT includes a plurality of solution plans each corresponding to a predetermined warning sound. The display unit displays a selecting interface thereon for a user to input a basic input output system (BIOS) type or a computer model of the computer. The detection unit records a warning sound emitted from the malfunctioning computer and generates an electronic sample of the warning sound. The processing unit searches the LUT to determine a solution plan corresponding to the sample, and controls the display unit to display the determined solution plan.

19 Claims, 4 Drawing Sheets

| Computer model | BIOS type | Warning sound (buzz) | Solution plan |
|---|---|---|---|
| A、B、C …… | Award | 2 short | Common error, load the default set |
| | | 1 long 1 short | RAM checksum error, re-plug or replace the RAM memory |
| | | 1 long 2 short | Video display card error, re-plug or replace the video display card |
| | | …… | …… |
| D、E、F …… | AMI | 1 short | RAM check error, re-plug or replace the RAM memory |
| | | 2 short | ECC check error, shut the ECC check in CMOS |
| | | 6 short | Keyboard controller error, re-plug keyboard or replace motherboard |
| | | …… | …… |
| G、H、I …… | Phoenix | 3 short | Initialization error, restart the computer |
| | | 2 short 2 long | Motherboard error, replace motherboard |
| | | …… | …… |

FIG. 2

COMPUTER ERROR DETECTION DEVICE AND METHOD

BACKGROUND

1. Technical Field

The present disclosure relates to a computer error detection device and a computer error detection method.

2. Description of Related Art

A typical personal computer includes a variety of components, for example a monitor, a motherboard, a central processing unit (CPU), a random-access memory (RAM), a power supply, an optical disc drive, a hard disk, a keyboard, and a mouse. When one component of the computer is damaged or malfunctions, the computer usually cannot work normally. Under this condition, when the faulty computer is powered on, a buzzer can generate and emit a warning sound to indicate which component of the computer is damaged or is malfunctioning. However, only a skilled person can easily distinguish which component is damaged or is malfunctioning according to the warning sound. A general user may find it very difficult to trace the fault and repair the computer simply according to the warning sound.

Therefore, a computer error detection device having function to overcome the above-described shortcomings is desired. A related computer error detection method is also desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

FIG. 2 is a schematic diagram of the look-up table of FIG. 1, according to one embodiment of the present disclosure.

DETAILED DESCRIPTION

Reference will be made to the drawings to describe various embodiments.

Figure 1:
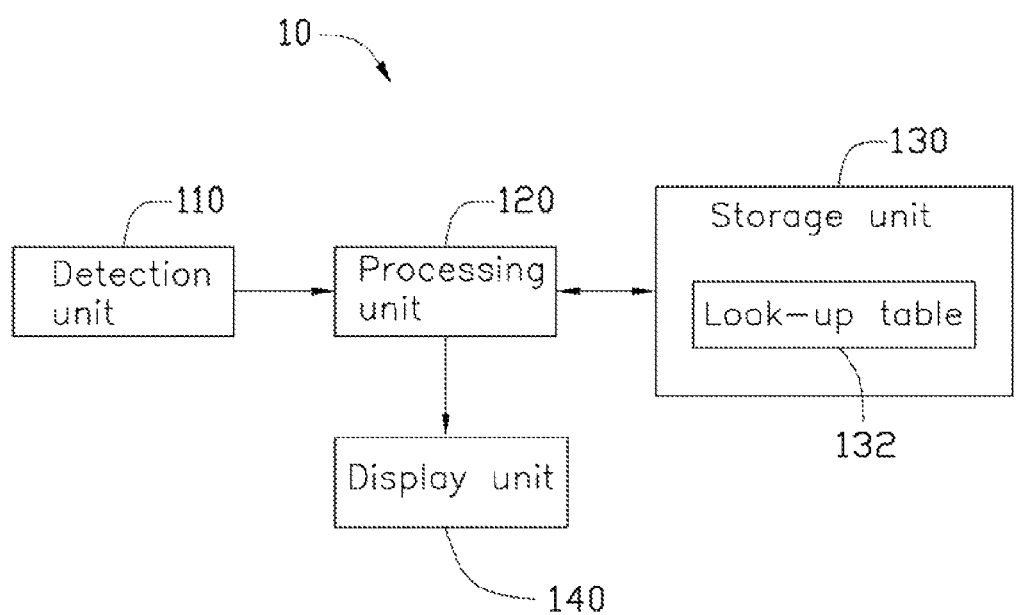
FIG. 1 is a block diagram of a computer error detection device according to one embodiment of the present disclosure, the computer error detection device including a look-up table.

Referring to FIG. 1, a block diagram of a computer error detection device 10 according to one embodiment of the present disclosure is shown. The computer error detection device 10 is configured to determine an error type of a computer which is damaged or malfunctioning, and to provide a solution plan according to the error type. When the computer is damaged or is operating wrongly, a buzzer of the computer can generate and emit various warning sounds to indicate a type of malfunction or error. In the embodiment, the computer includes a motherboard having a basic input output system (BIOS) for storing different warning sounds. The warning sounds may vary according to which one of different BIOS types is installed on the motherboard. For example, the BIOS type may be Award™ BIOS, AMI™ BIOS, or Phoenix™ BIOS.

In the embodiment, the computer error detection device 10 includes a detection unit 110, a processing unit 120, a storage unit 130, and a display unit 140. In one embodiment, the computer error detection device 10 may be incorporated as part of a mobile phone or portable computer.

The detection unit 110 detects the warning sound emitted from the computer which is damaged or malfunctioning, generates an electronic sample of the sound, and sends the sample to the processing unit 120.

The storage unit 130 includes a look-up table (LUT) 132. The LUT 132 includes a plurality of solution plans each corresponding to a predetermined warning sound of different BIOS types or different computer models. In one embodiment as shown in FIG. 2, the LUT 132 includes a first relationship between different computer models and different BIOS types, a second relationship between the different BIOS types and different warning sounds, and a third relationship between the different warning sounds and different solution plans. In the embodiment, each solution plan includes not only an error message corresponding to one predetermined warning sound of one BIOS type, but also a suggestion on how to repair the computer which is damaged or malfunctioning. For example, as shown in the third row of warning sounds and solution plans corresponding to computer models D, E, F . . . in FIG. 2, six short buzzes of an AMI™ BIOS indicates a keyboard controller error, and the user may remove and re-plug the keyboard or replace the motherboard to repair the computer which is malfunctioning. In an alternative embodiment, each solution plan may also include one or more pictures to show where the error is and/or how to repair the computer. In one embodiment, the storage unit 130 can be selected from a group consisting of compact discs (CDs), digital video discs (DVDs), Blu-Ray discs, Flash memory, and hard disk drives.

In operation of the computer error detection device 10, when a computer which is malfunctioning (or damaged) emits a warning sound, the user starts the computer error detection device 10, and inputs a computer model or a BIOS type of the computer via a selecting interface displayed on the display unit 140. The detection unit 110 then records the warning sound of the computer which is malfunctioning, and provides an electronic sample of the sound to the processing unit 120. The processing unit 120 searches the LUT 132 in the storage unit 130 to find out a predetermined solution plan which has a warning sound corresponding to the sample, and controls the display unit 140 to display the solution plan for helping the user to repair the computer which is malfunctioning.

Figure 3:
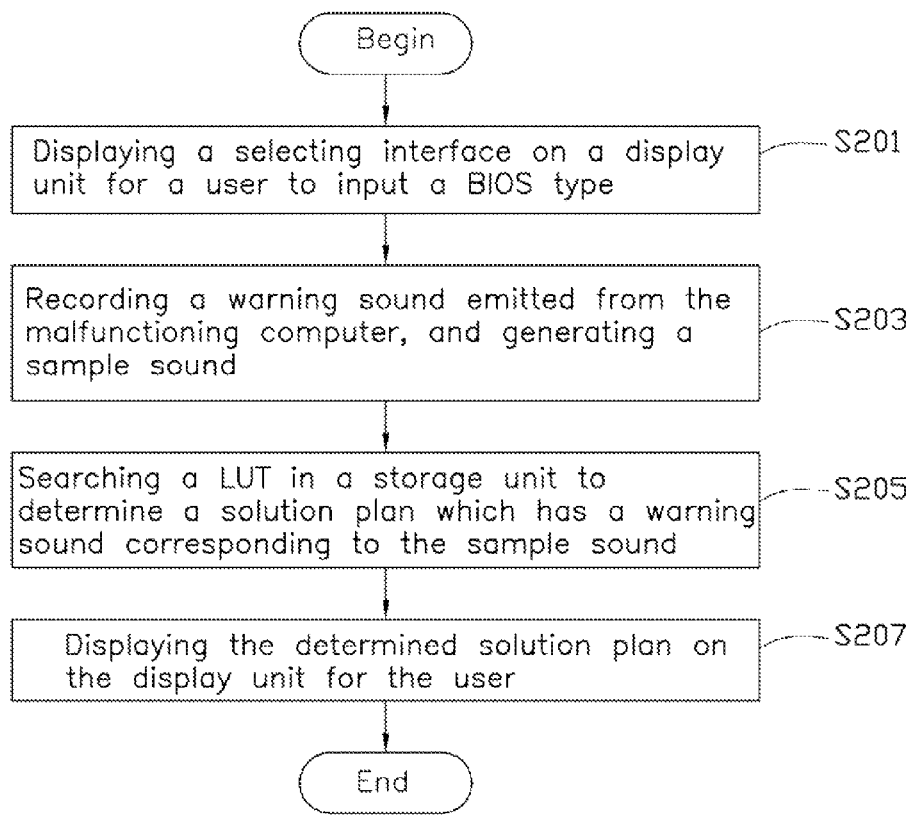
FIG. 3 is a flowchart of a computer error detection method using the computer error detection device of FIG. 1, according to a first method embodiment of the present disclosure.

Referring to FIG. 3, a computer error detection method according to a first method embodiment of the present disclosure is shown. The method is typically carried out using the computer error detection device 10. Depending on the embodiment, additional steps may be added, others removed, and the ordering of the steps may be changed.

In step S201, a BIOS type selecting interface is displayed on the display unit 140 for a user to input a BIOS type of a computer. In one embodiment, the display unit 140 is a touch display, and the user can input the BIOS type of the computer directly through the touch display. In an alternative embodiment, the computer error detection device 10 may further include an input unit such as a keypad for the user to input the BIOS type.

In step S203, the computer which is malfunctioning (or damaged) emits a warning sound to indicate an error type. The detection unit 110 records the sound emitted from the computer, generates an electronic sample of the sound, and sends the sample of the sound to the processing unit 120.

In step S205, the processing unit 120 searches the LUT 132 in the storage unit 130 to determine a solution plan which has a warning sound corresponding to the sample, and then provides the determined solution plan to the display unit 140. For example, as shown in the third row of warning sounds and solution plans corresponding to computer models D, E, F . . . of FIG. 2, if the computer which is malfunctioning has an AMI™ BIOS, the sample of the sound of six short buzzes corresponds to the solution plan of keyboard controller error, wherein the user may remove and re-plug the keyboard of the computer which is malfunctioning or replace the motherboard of the computer to repair the computer.

In step S207, the display unit 140 displays the determined solution plan to help the user to repair the computer which is malfunctioning.

Figure 4:
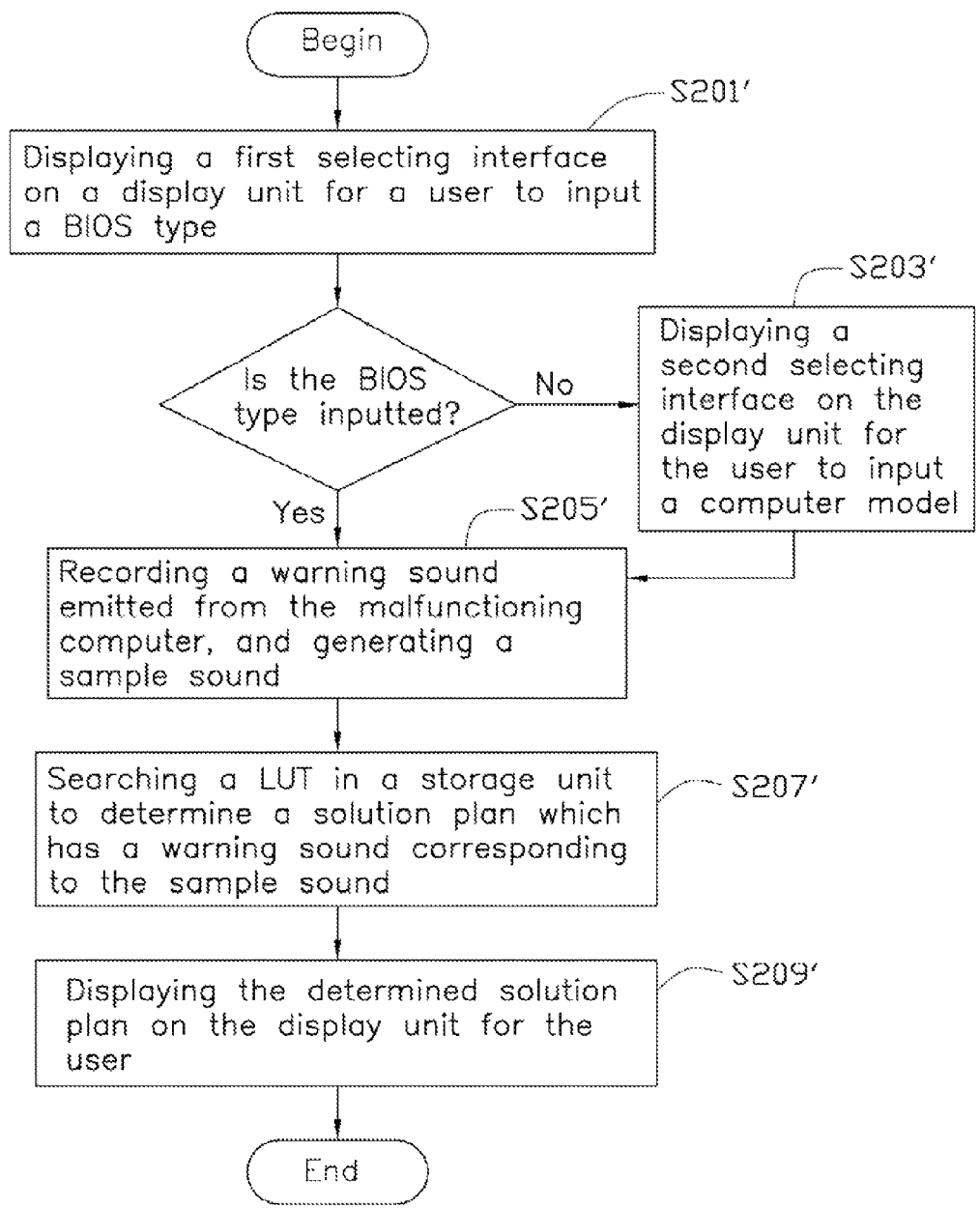
FIG. 4 is a flowchart of a computer error detection method using the computer error detection device of FIG. 1, according to a second method embodiment of the present disclosure.

Referring to FIG. 4, a computer error detection method according to a second method embodiment of the present disclosure is shown. The method is typically carried out using the computer error detection device 10. Depending on the embodiment, additional steps may be added, others removed, and the ordering of the steps may be changed.

In step S201', a first selecting interface is displayed on the display unit 140 for a user to input a BIOS type of a computer. In the embodiment, if the user has finished inputting the BIOS type, step S205' is performed immediately. If the user does not input any BIOS type, step S203' is performed instead. In one embodiment, the display unit 140 is a touch display, and the user can input the BIOS type of the computer directly through the touch display. In an alternative embodiment, the computer error detection device 10 may further include an input unit such as a keypad for the user to input the BIOS type.

In step S203', a second selecting interface is displayed on the display unit 140 for the user to input a computer model of the computer instead of the BIOS type. The procedure then goes to step S205'.

In step S205', the computer which is malfunctioning (or damaged) emits a warning sound to indicate an error type. The detection unit 110 records the warning sound emitted from the computer, generates an electronic sample of the sound, and sends the sample to the processing unit 120.

In step S207', the processing unit 120 searches the LUT 132 in the storage unit 130 to determine a solution plan which has a warning sound corresponding to the sample, and then provides a determined solution plan to the display unit 140. For example, as shown in the third row of warning sounds and solution plans corresponding to computer models D, E, F . . . of FIG. 2, if the computer which is malfunctioning has an AMI™ BIOS or is a computer model "D", the sample of the sound of six short buzzes corresponds to the solution plan of keyboard controller error, wherein the user may remove and re-plug the keyboard of the computer or replace the motherboard of the computer to repair the computer.

In step S209', the display unit 140 displays the determined solution plan to help the user to repair the computer which is malfunctioning.

It is to be understood that even though numerous characteristics and advantages of the present embodiments have been set forth in the foregoing description, with details of the structures and functions of the embodiments, the disclosure is illustrative only; and that changes may be in detail, especially in the matters of arrangement of parts within the principles of the embodiments to the full extent indicated by the broad general meaning of the terms in which the appended claims are expressed.

What is claimed is:

1. A computer error detection device for a computer which is malfunctioning and emitting a warning sound, the computer error detection device comprising:
    a storage unit comprising a look-up table (LUT), the LUT comprising a plurality of solution plans each corresponding to a predetermined warning sound;
    a display unit displaying a selecting interface thereon for a user to input a basic input output system (BIOS) type or a computer model of the computer which is malfunctioning;
    a detection unit recording a warning sound emitted from the computer which is malfunctioning to generate an electronic sample of the warning sound; and
    a processing unit searching the LUT to determine a solution plan which has a warning sound corresponding to the sample, and controlling the display unit to display the determined solution plan for the user.

2. The computer error detection device of claim 1, wherein the solution plan comprises an error message corresponding to the predetermined warning sound and a suggestion on how to repair the computer which is malfunctioning.

3. The computer error detection device of claim 1, wherein the solution plan comprises one or more pictures to show at least one of where the error is and how to repair the computer which is malfunctioning.

4. The computer error detection device of claim 1, wherein each predetermined warning sound corresponds to at least one criterion selected from the group consisting of a BIOS type of the computer and the computer model.

5. The computer error detection device of claim 1, wherein the LUT comprises a first relationship between different computer models and different BIOS types, a second relationship between the different BIOS types and different warning sounds, and a third relationship between the different warning sounds and different solution plans of the plurality of solution plans.

6. The computer error detection device of claim 1, wherein the storage unit is selected from the group consisting of compact discs (CDs), digital video discs (DVDs), Blu-Ray discs, Flash memory, and hard disk drives.

7. The computer error detection device of claim 1, wherein the display unit is a touch display.

8. A computer error detection method for a computer which is malfunctioning and emitting a warning sound, the method comprising:
    storing a look-up table (LUT) in a storage unit, the LUT comprising a plurality of solution plans each corresponding to a predetermined warning sound;
    displaying a first selecting interface on a display unit for a user to input a basic input output system (BIOS) type of the computer;
    recording a warning sound emitted from the computer, and generating an electronic sample of the warning sound, by a detection unit;
    searching the LUT to determine a solution plan which has a warning sound corresponding to the sample, by a processor; and
    displaying the determined solution plan on the display unit.

9. The computer error detection method of claim 8, further comprising displaying a second selecting interface on the display unit for the user to input a computer model of the computer instead of the BIOS type of the computer when the user does not input any BIOS type of the computer.

10. The computer error detection method of claim 8, wherein the solution plan comprises an error message corresponding to the predetermined warning sound and a suggestion on how to repair the computer which is malfunctioning.

11. The computer error detection method of claim 8, wherein the solution plan comprises one or more pictures to show at least one of where the error is and how to repair the computer which is malfunctioning.

12. The computer error detection method of claim 8, wherein each predetermined warning sound corresponds to at least one criterion selected from the group consisting of a BIOS type of the computer and the computer model.

13. The computer error detection method of claim 8, wherein the LUT comprises a first relationship between different computer models and different BIOS types, a second relationship between the different BIOS types and different warning sounds, and a third relationship between the different warning sounds and different solution plans of the plurality of solution plans.

14. A computer error detection device for a computer which is malfunctioning and emitting a warning sound, the computer error detection device comprising:
- a storage unit comprising a look-up table (LUT), the LUT comprising a plurality of solution plans each corresponding to a predetermined warning sound;
- an input unit for a user to input a basic input output system (BIOS) type or a computer model of the computer which is malfunctioning;
- a detection unit configured for recording a warning sound emitted from the computer which is malfunctioning, and generating an electronic sample of the warning sound; and
- a processing unit configured for searching the LUT to determine a solution plan which has a warning sound corresponding to the sample, and controlling a display unit to display the determined solution plan for the user.

15. The computer error detection device of claim 14, wherein the solution plan comprises an error message corresponding to the predetermined warning sound and a suggestion on how to repair the computer which is malfunctioning.

16. The computer error detection device of claim 14, wherein the solution plan comprises one or more pictures to show at least one of where the error is and how to repair the computer which is malfunctioning.

17. The computer error detection device of claim 14, wherein each predetermined warning sound corresponds to at least one criterion selected from the group consisting of a BIOS type of the computer and the computer model.

18. The computer error detection device of claim 14, wherein the LUT comprises a first relationship between different computer models and different BIOS types, a second relationship between the different BIOS types and different warning sounds, and a third relationship between the different warning sounds and different solution plans of the plurality of solution plans.

19. The computer error detection device of claim 14, wherein the storage unit is selected from the group consisting of CDs, DVDs, Blu-Ray discs, Flash memory, and hard disk drives.

\* \* \* \* \*